US005389959A

United States Patent [19]

Haas

[11] Patent Number: 5,389,959

[45] Date of Patent: Feb. 14, 1995

[54] THERMAL PRINTING SYSTEM

[75] Inventor: Daniel D. Haas, Webster, N.Y.

[73] Assignee: Eastman Kodak Company, Rochester, N.Y.

[21] Appl. No.: 246,384

[22] Filed: May 20, 1994

Related U.S. Application Data

[63] Continuation of Ser. No. 865,508, Apr. 9, 1992, abandoned.

[51] Int. Cl.[6] ........................ B41J 2/475; G01D 15/14

[52] U.S. Cl. ........................ 347/187; 347/234

[58] Field of Search ........................ 346/107 R, 76 L

[56] References Cited

U.S. PATENT DOCUMENTS 4,383,261 5/1983 Goldberg ........................ 346/76 L X
4,748,455 5/1988 Mori ........................ 346/76 PH
4,827,286 5/1989 Sukigara et al. ........................ 346/76 PH
4,836,697 6/1989 Plotnick et al. ........................ 400/120
4,845,520 7/1989 Mori ........................ 346/76 PH
4,859,093 8/1989 Plotnick ........................ 400/120
4,903,042 2/1990 Käufl et al. ........................ 346/76 L
4,973,572 11/1990 DeBoer ........................ 503/227
5,066,962 11/1991 Sarraf ........................ 346/76 L
5,164,742 11/1992 Baek et al. ........................ 346/76 L

*Primary Examiner*—George H. Miller, Jr.
*Assistant Examiner*—David Yockey
*Attorney, Agent, or Firm*—Dennis R. Arndt

[57] ABSTRACT

There is disclosed a thermal printer system having a multiple channel laser print head which focuses closely spaced spots of laser light energy onto a dye donor element which moves at constant velocity relatively past the print head. These laser light spots respectively print multiple lines of an image a swath at a time by heat transfer of pixels or subpixels of dye from the dye donor element to a receiver element. A light source (such as an arc lamp) applies to the dye donor element one or more precisely positioned spots of light energy which elevate the temperature of the dye donor element substantially uniformly within a zone coincidently with and closely surrounding the laser light spots. The shape, the position and the power absorbed within the zone from the light source are carefully controlled. Thus the temperature within this zone is held to a substantially uniform value slightly below the vaporization temperature of the dye to be transferred from the dye donor element. In this way the linearity and fidelity of a printed image are substantially improved, and "printing artifacts" such as banding and streaking are reduced.

25 Claims, 4 Drawing Sheets

THERMAL PRINTING SYSTEM

This is a continuation of U.S. application Ser. No. 865,508, filed 9 Apr. 1992, now abandoned.

FIELD OF THE INVENTION

The present invention relates to a thermal printing system, and, more particularly, to an improved apparatus and to a method for thermal printing of images of very high quality, such as full color pictures with tone scales and fineness of detail rivaling and even exceeding those of the highest quality photographic and/or lithographic prints.

BACKGROUND OF THE INVENTION

One type of thermal printer employs a dye-donor element placed over a dye-receiver element. The two elements together are moved past a print head having a plurality of very small heat "sources". When a particular heating source is energized, thermal energy from it causes a small dot or pixel of dye to transfer from the dye donor element onto the receiver element. The density of each dye pixel is a function of the amount of energy delivered from the respective heating source of the print head to the dye donor element. The individual pixels are printed in accordance with image data. All of the dye pixels thus formed together define the image printed on the receiver element.

Because light from a laser can be focused to an ultra-fine, intense spot of heat energy and can be modulated at very high speed, lasers (e.g., small, relatively inexpensive diode lasers) are now the preferred heating sources for printing the dye pixels in more advanced thermal printers. In the case where pixels are printed at very fine pitch on very closely spaced lines (e.g., 1800 lines per inch and 1800 pixels per inch), hundreds of millions of pixels are used in printing a page size picture. It is costly at present to provide an individual laser for each line of pixels across the width of a page being printed. For example, a 10 inch wide page would require 18,000 lasers, along with their respective drive circuits. On the other hand, using only one laser and scanning in sequence the lines across a page to print an image pixel by pixel is a very much slower operation than when multiple lasers are used.

In U.S. patent application Ser. No 451,655, filed Dec. 18, 1989, now U.S. Pat. No. 5,164,742, entitled "Thermal Printer" and assigned to an assignee in common with the present patent application, there is disclosed a thermal printer employing a plurality of lasers for printing a like plurality of lines of print pixels at the same time. This thermal printer produces full color pictures printed by thermal dye transfer in accordance with electronic image data corresponding to the pixels of a master image. The pictures so produced have ultra-fine detail and faithful color rendition which rival, and in some instances exceed in visual quality, large photographic prints made by state-of-the-art photography. This new thermal printer is able to produce either continuous-tone or half-tone prints. In the continuous tone mode, the ultra-fine printed pixels of colored dye have densities which vary over a continuous tone scale in accordance with the image data. On the other hand in the half-tone mode, the ultra-fine print pixels which define the picture are formed by more or fewer subpixels of dye such that a greater fraction of the area of each pixel is darkened or remains undarkened in order to appear to the eye as having greater or lesser density and thus simulate a continuous tone scale. Half-tone offset printing is widely used in printing and publishing.

The human eye is extremely sensitive to differences in tone scale, to apparent graininess, to color balance and registration, and to various other incidental defects (termed "printing artifacts") in a picture which may occur as a result of the process by which the picture is reproduced. Thus it is highly desirable for a thermal printer such as described above, when used in critical applications, to be as free as possible from such printing artifacts.

The thermal printer described in the above-mentioned U.S. Patent Application has a rotating drum on which can be mounted a print receiving element with a dye donor element held closely on top of it. The two elements are in the form of thin flexible rectangular sheets of material mounted around the circumference of the drum. As the drum rotates, a thermal print head, with individual fiber optic channels, projects multiple laser light beams in closely spaced, ultra-fine light spots focused on the dye donor element. Simultaneously the print head is moved in a lateral direction parallel to the axis of the drum so that with each rotation of the drum multiple lines (termed a "swath") of subpixels are printed on the receiving element. The pixels are printed in accordance with image data applied to the electronic driving circuits of the respective laser channels. There are as many image lines in a swath as there are laser channels (e.g., 12 lines with a lateral spacing of 1800 lines per inch), and there are as many swaths as required to print an image or picture of a given page width. It has been found with such a printer, in the absence of expensive corrective measures, that there may be produced visually noticeable printing artifacts in the picture which impair its quality.

In the kind of thermal dye-transfer imaging described above, there is employed a dye donor element in the form of a thin sheet of material having a thermally reactive dye on one surface. Such a donor element is disclosed in U.S. Pat. No. 4,973,572 and assigned to an assignee in common with the present patent application. The donor element is placed with its dye coated surface closely adjacent (e.g., about 8 micrometers distant) to a receiver element (e.g., a suitable sheet of paper). Then the donor element is "scanned" by each laser beam focused on the back of the donor element to a very small spot of light (e.g., about 7 micrometers diameter). As explained in U.S. Pat. No. 4,973,572, the dye donor element contains an infrared light absorbing compound which generates heat from the laser spots and causes subpixels of visible dye carried by the donor element to transfer to the receiver element to produce an image. As each laser spot is linearly scanned along the donor element, each laser is electronically modulated at very high frequency to provide greater or lesser heat energy in the focused light spot. The thermal energy in a respective light spot passing through the donor element causes the dye over the area of the spot to vaporize to a greater or lesser degree depending on the heat energy content of the laser light spot. The dye thus removed in the area of the light spot transfers as a dot or pixel of dye and is deposited onto the receiver element. The density of such a transferred dot of dye is a function of the total thermal energy absorbed through the donor element into the dye at the light spot.

It has been found that the density of a pixel of dye in a thermal printer of this kind after being printed on the receiver element may not be properly related to the amount of energy provided by its particular laser beam. For example, the thermal energy applied instantaneously to a particular spot by its respective laser beam may also have unwanted or excess heat energy added to it by thermal migration of energy within the dye donor element from a closely spaced laser light spot produced by an adjacent channel being operated at the same time though independently modulated. As a result of this unwanted thermal interaction amongst the independent laser channels, densities of some pixels of the printed image may not be exact reproductions of the densities of the master image. This results in "printing artifacts" such as dark streaks termed "banding", and in a degradation of the visual quality of the printed image, especially when viewed critically.

Various different thermal printing system using preheating in one form or another of a dye donor element prior to its being energized by a heat source in printing a dye pixel onto a receiver element have been tried in the past. Increases in printing speed and reductions in power necessary for printing have been claimed. But nonetheless, problems of "printing artifacts" in multiple laser printers and of obtaining the highest fidelity of reproduction of a master image have remained. The present invention provides an efficient and cost effective solution to these problems.

SUMMARY OF THE INVENTION

In accordance with one aspect of the present invention, a thermal printer having a multiple laser print head (such as described in the above-identified U.S. patent application Ser. No. 451,655) is provided with an additional high-power source of light energy. The high-power light source applies a carefully contoured and precisely positioned amount of thermal energy to a dye donor element in the printer. This thermal energy, in one arrangement, is applied to the dye donor element as a single round spot of light having a Gaussian distribution with a standard-deviation (sigma) beam irradiance radius chosen to provide precisely controlled pre-heating of the dye donor element. The incremental equi-temperature contours (described in detail hereinafter) of the pre-heated region of the dye donor element are carefully matched to the laser light spot positions and writing width of the multiple laser print head in the printer to the following: 1. The velocity of the print medium past the print head, 2. The temperature, energy and heat transfer characteristics of the dye donor element, and 3. The spatial distribution of outputs from the individual lasers of the print head during printing of the pixels of an image. By elevating the temperature of the dye donor element in the region of the laser light spots to a substantially uniform and carefully controlled value slightly below the temperature required for vaporization of the dye of the dye donor element, dynamic thermal interactions between the individual laser light spots (which print respective pixels of an image) are greatly reduced if not eliminated altogether. This in turn effectively eliminates certain "printing artifacts" normally inherent in multiple laser thermal printers. Moreover, as will be explained in greater detail hereinafter, compared to previous thermal printers, the image density here of the printed pixels is a much more nearly linear function of applied power. The scale of image density extends over a substantially larger fraction of the "exposure" range applied to the dye donor element by the individual lasers of the print head. As a result, the fidelity and tone quality of a printed image is enhanced.

In accordance with another aspect of the present invention, light from the high-power light source is divided into two beams which are focused onto the dye donor element as two separate light spots. The aggregate thermal energies provided by these two light spots result in equi-temperature contours narrower and more closely fitting around the light spots in which the multiple lasers of the print head focus their writing energy. Less total energy is required in these two light spots for the same improvement in operation than for the one spot arrangement described above.

In accordance with still another aspect of the present invention, there is provided a thermal printer system with a print head having at least one laser channel for applying a laser light spot to a dye donor element to print individual pixels onto a receiver element in accordance with an image to be printed. The printer system comprises means for moving the dye donor element in a line scan direction relatively past the print head at a controlled velocity, the dye donor element having a dye vaporization temperature substantially above ambient. The system also comprises a light source for applying a light spot to the dye donor element for greatly elevating the temperature within a small zone on the dye donor element. The temperature within the zone is substantially uniform and is controlled to a value just below the dye vaporization temperature. The zone of elevated temperature lies upon and is only slightly larger than the fine laser light spot such that the linearity and the range of image density versus laser exposure are substantially improved.

In accordance with yet another aspect of the present invention, there is provided a method of operating a thermal printer to obtain improved linearity and freedom from printing artifacts in the images being printed. The method comprises the steps of: applying to a dye donor element closely spaced spots of heat energy to print individual pixels onto a receiver element in accordance with an image to be printed, the dye in the dye donor element having a substantially elevated vaporization temperature; moving the dye donor element relatively past the closely spaced spots of heat energy at a controlled velocity; and applying a spot of heat energy to the dye donor element over a small precisely positioned zone within which the temperature is raised substantially uniformly to just below the dye vaporization temperature, the zone closely surrounding the fine closely spaced spots of heat energy such that the fidelity of the printed images is improved.

The invention will be better understood from a consideration of the following detailed description taken in conjunction with the accompanying drawings and claims.

The drawings are not necessarily to scale.

DETAILED DESCRIPTION

Figure 1:
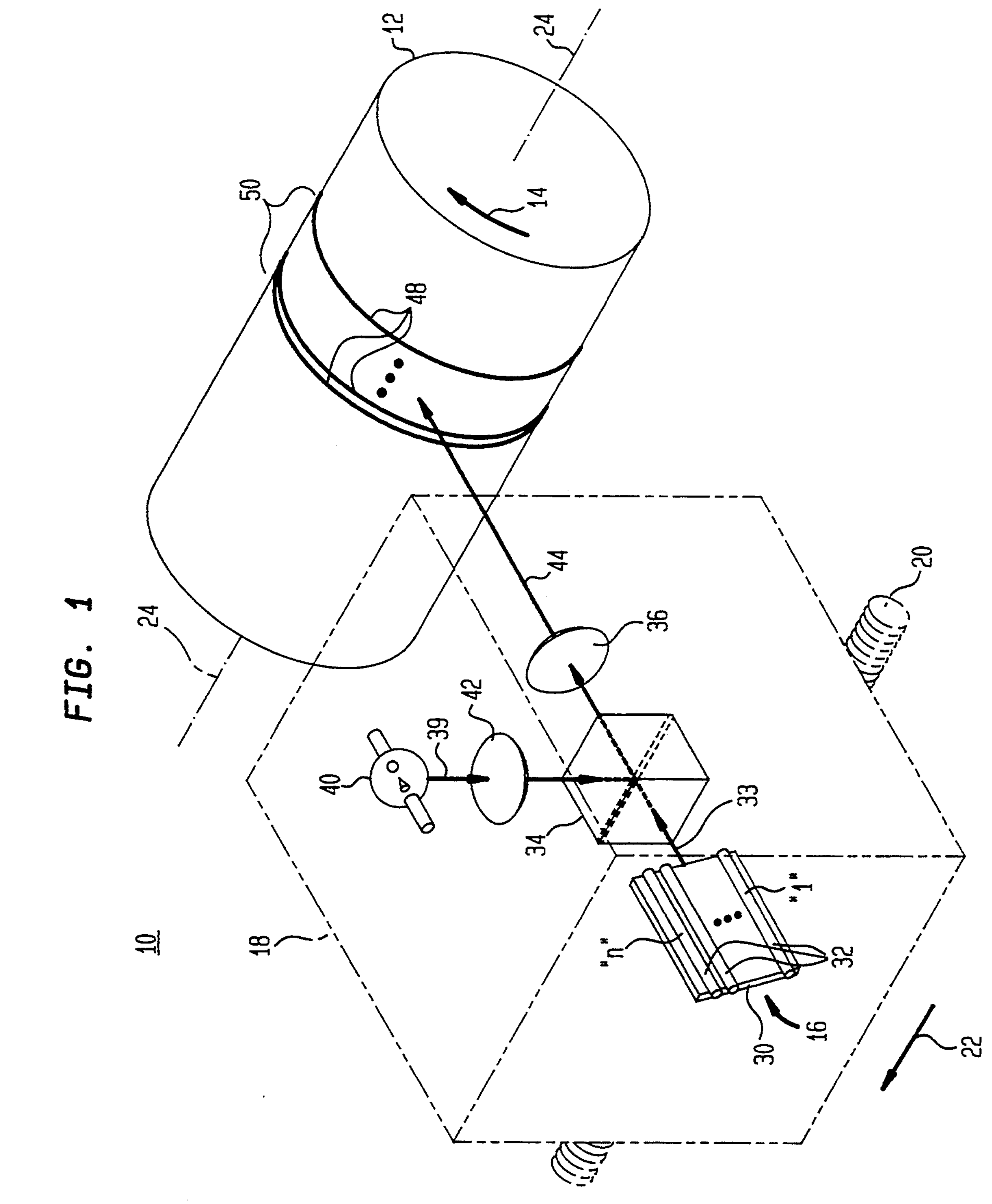
FIG. 1 is a schematic illustration of a thermal printer having a multiple laser print head and having an additional high-power light source provided in accordance with the present invention.

Referring now to FIG. 1, there are shown in schematic form elements of a thermal printer 10 in accordance with the present invention. The thermal printer 10 comprises a drum 12, a print head 16, support means 18 (shown within a dashed line rectangle), a feedscrew 20, a beam splitting prism 34, a lens 36, a lens 42, and a high-power light source 40. The drum 12 is mounted for rotation in the direction indicated by a curved arrow 14 on a frame (not shown). The thermal print head 16, which is shown supported within the dashed-line box 18 that represents means of support not otherwise shown, is thereby mounted on the feedscrew 20 (also mounted on the frame) for lateral motion in the direction of a straight arrow 22 parallel to an axis of rotation 24 of the drum 12. The rotation of drum 12 in the direction of the curved arrow 14 is termed the "line scan" direction and the lateral movement of the print head 16 in the direction of the straight arrow 22 is termed the "page scan" direction. The print head 16 comprises a "V-grooved" plate 30 on which are mounted a number of closely spaced fiber optic laser channels 32 identified respectively as "1" through "n". Each of the laser channels "1" through "n" provides a very small beam of light energy from respective lasers (not shown). The plate 30 of the print head 16 is angularly adjusted (by means not shown) so that the light beams from the fiber optic laser channels 32 lie in a plane at a precise angle to the vertical in the page scan direction. Further details of the print head 16 and the precise mounting of all of the fiber optic channels "1" through "n" are given in the above identified U.S. patent application Ser. No. 451,655 which is incorporated herein by reference.

The individual light beams, illustrated here as a single beam 33 from the laser channels 32, are directed through the beam-splitting (combining) prism 34, and then to the focusing lens 36. Similarly, a light beam 39 from the high-power light source 40 is directed through the collimating lens 42 through the beam-splitting prism 34 and to the focusing lens 36. The separate beams 33 and 39, which are illustrated for simplicity here as a combined beam 44, are focused onto a dye donor element (not shown) which is positioned around the circumference of the drum 12. These multiple laser beams 33, the high-power beam 39, and their relationships to each other and the dye donor element are described in greater detail hereinafter. The light source 40, the lenses 36 and 42, and the beam-splitting prism 34 are mounted along with the print head 16 on the support means 18. During operation of the printer 10, the support means 18 (and the elements mounted on it) are driven slowly in the page scan direction (arrow 22) by the feedscrew 20. The light source 40, by way of example, is an arc lamp, Hamamatsu part No. L2194-01, driven by a C4262 power supply. The lamp produces light with a color temperature of about 5000° K.

As the print drum 12 rotates and the individual laser channels "1" through "n" are energized with print or line data corresponding to image data of a picture being printed, these respective laser channels "1" through "n" print through the dye donor element (not shown) closely spaced lines of subpixels on a receiving element (not shown) mounted on the drum 12. These closely spaced image lines 48 form what is termed a "swath". A single such swath 50 is shown greatly enlarged and not to scale for the sake of illustration. It is to be understood that the lines 48 of each swath 50 are very close together (e.g., 1800 lines per inch) and that there are as many swaths 50 contiguously side-by-side as required by the image being printed. It is to be further understood that as a portion of an image is rapidly printed along a swath 50 in the line scan direction (arrow 14), the swath 50 shifts slowly laterally in the page scan direction (arrow 22) because of the lateral motion of the print head 16 imparted by the feedscrew 20. At the end of a revolution of the drum 12, one swath 50 ends and another swath 50 begins with the swathes 50 being precisely registered in position. Thus all of the swaths 50, when printing is finished, comprise a visually seamless image.

Figure 2:
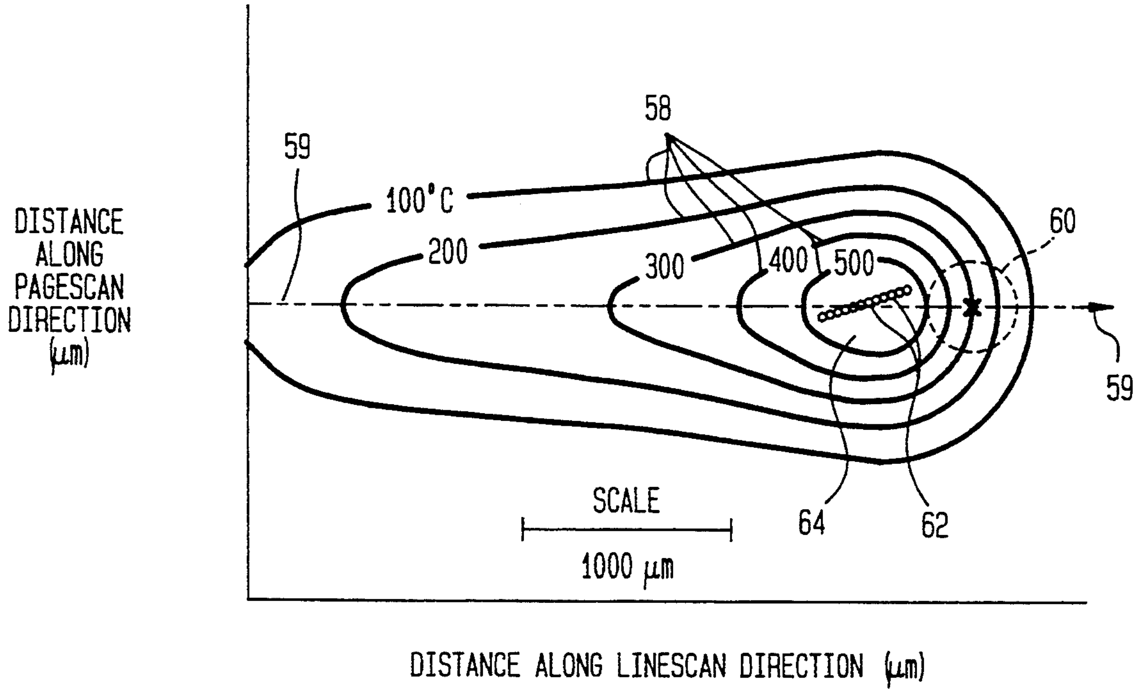
FIG. 2 is a graph which shows elevated equi-temperature contours produced at the dye donor element by a focused light spot of the high-power light source of FIG. 1 during operation of the printer with relative positions within these equi-temperature contours of the pixel-writing light spots of the individual laser channels of the print head being shown.

Referring now to FIG. 2, there is shown a graph with distance along the pagescan direction on the vertical axis and distance along the linescan direction shown on the horizontal axis. Distances in each direction are as indicated by the scale given. The graph shows equi-temperature contours 58 (in degrees Celsius above ambient) produced in a dye donor element by the high-power light beam 39 during operation of the thermal printer 10. The equi-temperature contours 58 are elongated in the line scan direction (horizontal axis), as indicated by the dashed-line horizontal arrow, and are symmetrical above and below the arrow 59. As explained previously, the light beam 39 is focused on the dye donor element as a round high-power spot 60 having a Gaussian intensity distribution. This light spot is indicated here by the dotted-line circle 60 shown with a center denoted at "X". Positioned a suitable small distance to the left of the center "X" of the high-power light spot 60 are a number of very small circles 62 representing the fine, individual light spots of the laser light beams produced by the respective laser channels "1" through "n" which are focused on the dye donor element. The dashed-line arrow 59 indicates the direction of the scanning motion of the laser light spots 62 relative to the dye donor element. The laser light spots 62 lie along a line (as determined by the plate 30 of FIG. 1) which is nearly at right angles to the page scan direction indicated by the vertical axis here. By way of example and for the sake of illustration, there are shown twelve laser light spots 62 and they are oriented along a line at an angle of 73.7° relative to the page scan direction. These laser light spots 62 are for example Gaussian with a radius of 7 micrometers (sigma) and lie along a line (on the dye donor element) on 50 micrometer centers. They are vertically spaced apart in the page scan direction by 14 micrometers. This spacing results in a pitch of 1800 lines/inch of the lines 48 of a swath 50 (see FIG. 1). These laser light spots 62 are staggered at distances of 48 micrometers along the line scan direction. A one sigma radius of the high-power light spot 60 is here 400 micrometers (sigma), and its center "X" is advantageously located a distance of from ½ sigma to 3/2 sigma from the midpoint of the line of laser light spots 62. The center of the light spot 60 as illustrated here is by way of example one sigma in distance from the midpoint of the line of laser light spots 62. "Sigma" is defined as the distance from the center of a Gaussian distribution to the point at which its value is 61% of peak value. The dye donor element is assumed to be moving at a constant velocity of about 10 m/sec. relatively past (underneath) the high-power light spot 60 and the laser light spots 62. As illustrated in this graph, with the incremental equi-temperature contours 58 elongated to the left as shown, the dye donor element (not shown) moves at constant velocity of about 10 m/sec. in the line scan direction to the left relative to the high-power light spot 60 and the laser light spots 62. Thus the high-power light spot 60 pre-heats the dye-donor element to a substantially elevated temperature above ambient in an elongated zone 64 closely surrounding the laser light spots 62. The power absorbed into the dye donor element from the high-power light spot 60 is, for example, approximately 60 watts. The center "X" of the high-power spot 60 is carefully positioned in advance of the mid-point of the line of the laser light spots 62 so that they lie within the zone 64 where substantially uniform and closely controlled pre-heating of the dye donor element occurs. The important benefits (reduction in printing artifacts, improvement in linearity, etc.) resulting from this arrangement are further explained hereinbelow. A dye containing layer of the donor element is, for example, 0.5 micrometer thick and the vaporization threshold of its dye is about 610° C. above ambient temperature (nominally 20° C.).

The elongated zone 64 is bounded by the equi-temperature contour 58 of 500° C. above ambient temperature. The center part of the zone 64 reaches a temperature of only about 580° C. above ambient. Thus the elevated temperature experienced by the laser light spots 62 within the zone 64 is substantially uniform and varies only about ten percentage points (from about 85% to 95% of the dye vaporization threshold temperature of about 610° C. above ambient). The print drum 12, by way of example, is 6.9 inches in diameter, 13 inches long and rotates at a constant velocity of 1200 RPM (50 ms/rev.). The elevated temperature of the zone 64 endures at a given location on the dye donor element for less than a millisecond, whereas 50 milliseconds are required for a complete revolution of the print drum 12. Thus the residual effect of the elevated temperature within the zone 64 on a subsequent swath 50 adjacent the one being printed is minimal.

Figure 3:
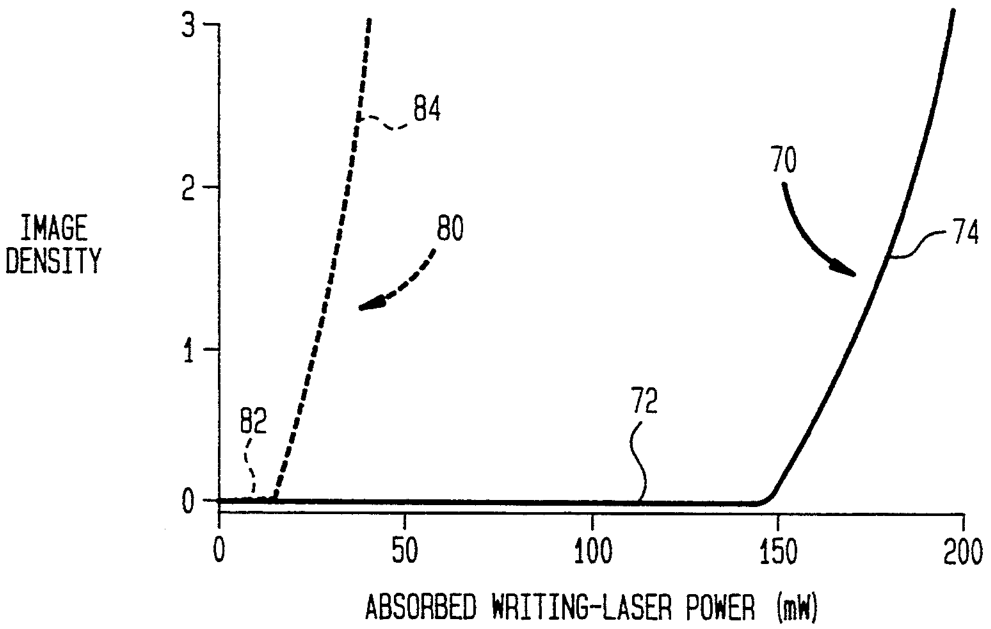
FIG. 3 is a graph showing image density of printed pixels as a function of writing-laser power absorbed in the dye donor element for the conditions "with" and "without" the additional high-power light spot provided in accordance with the present invention.

Referring now to FIG. 3, there is shown a graph in which image density in standard units of density (as measured by a microdensitometer) is on the vertical axis, and absorbed writing-laser power in milliwatts for each laser is on the horizontal axis. The graph depicts a solid-line response curve 70 of the writing-laser power absorbed by the dye donor element from each one of the laser channels "1" through "n" as related to the image density of pixels transferred from the dye donor element to the receiver element in the absence of the high-power beam 39 and the light source 40 of the thermal printer 10 (FIG. 1). The solid-line curve 70 is typical of the functional response of image density versus writing-laser power of a multiple laser thermal printer such as disclosed in the above-identified U.S. patent application Ser. No. 451,655. It is to be noted that the curve 70 has an extended horizontal portion 72 throughout which no image density is produced as writing-laser power is increased up to about 150 mW. Thereafter, as writing power is increased, image density increases in accordance with an upwardly sloping portion 74 of the overall response curve 70. The horizontal portion 72 of the curve 70 shows that a substantial amount of the writing power of the laser is expended in the dye donor heating element before any transfer of image density begins. One undesirable effect of this is that the dye donor element receives at the locations of the laser light spots 62 (produced by the respective laser channels "1" through "n") variable and uneven temperature distribution from preceding neighboring activated laser light spots 62 due to overlap of areas that have received exposure and due to thermal diffusion during the multiple-line printing of a swath 50 in the absence of the high-power light beam 39 (FIG. 1). The laser power below about 150 mW pumped into the dye donor element by a given laser channel, as indicated by the horizontal portion 72 of the curve 70, merely serves to elevate the temperature of the dye donor element to the dye vaporization temperature (e.g., about 610° C. above ambient). This "heating-up" power supplied along the horizontal portion 72 of the curve 70 results in a considerable amount of localized heating at a respective laser light spot 62 of the dye donor element. The thermal "heating up" energy thus locally generated at one laser spot 62 can, when there is at that instant a temperature differential adjacent the spot, quickly migrate within the dye donor element to the vicinity of another closely spaced laser spot 62 of a different laser channel. This migrating of energy within the dye donor element provides an unwanted and largely uncontrollable additional amount of heating at the other laser spot 62. Under certain conditions the thermal interaction from laser spot to laser spot results in visible printing artifacts, such as banding and streaking, which seriously degrade the quality of an image being printed.

The graph of FIG. 3 also shows a dashed-line response curve 80 which results when a high-power light beam 39 (and its corresponding light spot 60) are employed in accordance with the present invention. The greatly improved dashed-line response curve 80 of image density versus absorbed writing-laser power is obtained when the dye donor element is pre-heated within the carefully controlled and precisely positioned elevated temperature zone 64 (see FIG. 2). The dashed-line response curve 80 has a relatively short horizontal portion 82. In other words, very little writing power applied to a respective one of the laser light spots 62 is expended in merely heating up the dye donor element to the dye vaporization temperature (about 610° C. above ambient). Application of additional writing-laser power above about 20 mW vaporizes more and more dye from the dye donor element to produce image densities versus absorbed power as indicated by the upwardly sloping portion 84 of the response curve 80. The power applied over the upwardly sloping portion 84 of the curve 80 is devoted predominantly to the heat of vaporization of the dye, with effectively no further elevation of the temperature of the dye donor element once the dye's phase change temperature has been attained throughout the vicinity of the line of laser light spots 62. There is very little temperature gradient among the laser light spots 62 with preheating so that there is essentially no impetus for the heat energy deposited at one laser light spot to diffuse to a closely adjacent laser light spot 62. As a result, undesirable effects (e.g., printing artifacts) of thermal interactions between the laser light spots 62 are greatly reduced, if not entirely eliminated. The short horizontal portion 82 of the curve 80 is deliberately made slightly longer than zero in order to compensate for small unevenness in the temperature within the zone 64 (see FIG. 2) and for slight variations in certain physical parameters (laser power, beam size, scanning speed, donor dye-layer thickness, etc.).

The solid-line curve 70 with its long horizontal portion 72 and its upwardly sloping portion 74 in FIG. 3 indicates a very non-linear relationship between image density and laser-writing power. The dashed-line response curve 80 (obtained by virtue of the invention) indicates a far more nearly linear relationship of image density to writing-laser power as compared to the solid-line response curve 70 (obtained using conventional apparatus). The effect of precisely controlled heating of the dye donor element within zone 64 (see FIG. 2) to just below the dye vaporization threshold is to position the upwardly sloping portion 84 of the dashed-line response curve 80 so that this portion 84 begins very nearly at zero power, zero density. The portion 84 of curve 80 then proceeds upward in an almost perfectly linear relationship of image density versus writing-laser power.

Figure 4:
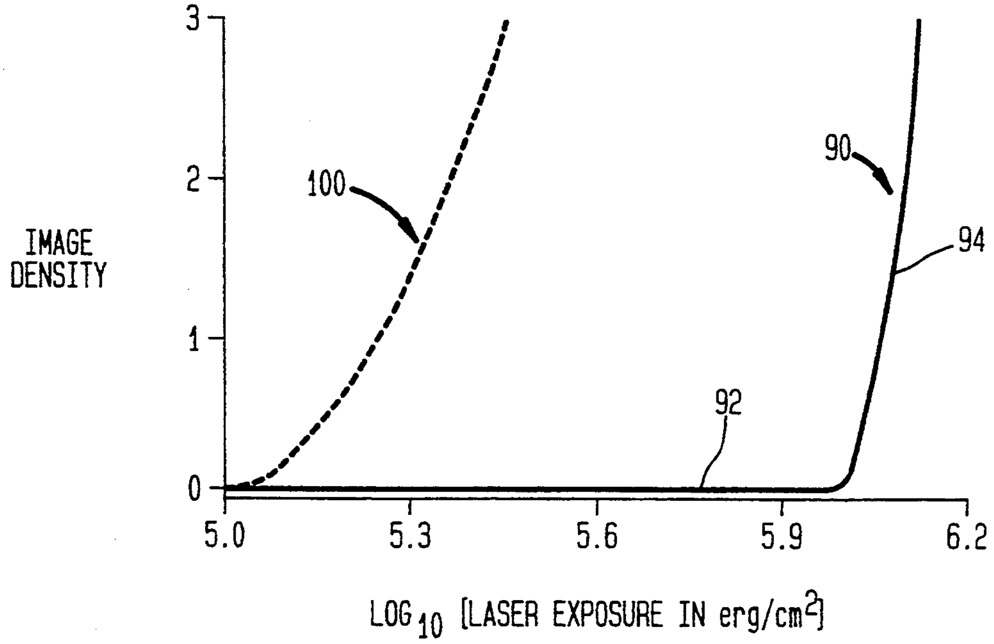
FIG. 4 is a graph showing image density of printed pixels as a function of the logarithm of the laser exposure in energy per unit of area for the conditions "with" and "without" the additional high-power light spot of the present invention.

Referring now to FIG. 4, there is shown a graph in which image density is on the vertical axis in standard units of density and laser exposure in erg/$cm^2$ is on horizontal axis in logarithmic units. A solid line curve 90 and a dashed line curve 100 are shown in the graph of FIG. 4. This graph is in a format customarily employed in the photographic industry to relate image density (standard units from 0 to 3) to "exposure" (logarithm of laser exposure in ergs/$cm^2$). The "exposure" units of "5" to "6.2" along the horizontal axis here are obtained by mathematical transformation of the absorbed writing-laser power (shown along the horizontal axis of FIG. 3). This is obtained according to Eq. (1):

$$\text{Exposure in } erg/cm^2 = (P_{laser} \times 1{,}000{,}000) \div Y\, V \quad (1)$$

in which $P_{laser}$ is the power from each laser deposited on the donor dye element expressed in milliwatts, Y is the spacing between successive scanlines in the swath 50 expressed in micrometers, and V is the scanning velocity of the laser light spots 62 across the donor dye layer expressed in meters/sec.

The solid-line response curve 90 of FIG. 4 represents an operating characteristic of a conventional thermal printer (similar to the printer 10 of FIG. 1), but without a high-power light source (such as source 40). The solid-line response curve 90 has a long horizontal portion 92 and a steep upwardly sloping portion 94. The response curve 90 accordingly shows a great deal of non-linearity in image density versus laser exposure, and a relatively narrow range of exposure for the full scale of image density. The dashed line curve 100 represents an operating characteristic of the thermal printer 10 of FIG. 1. By contrast, a lower slope of the dashed-line response curve 100, which corresponds to the present invention (i.e., the improvement provided by the high-power light spot 60 and the elevated temperature zone 64 of FIG. 2), shows a nearly linear relationship of image density versus laser exposure. It is to be noted that the exposure latitude indicated by the dashed-line curve 100 for the full range of image density (0 to 3) is considerably greater than that indicated by the steep upwardly sloping portion 94 of the solid-line curve 90. A wide range of exposure versus image density facilitates obtaining the desired tonal quality of a printed image.

Figure 5:
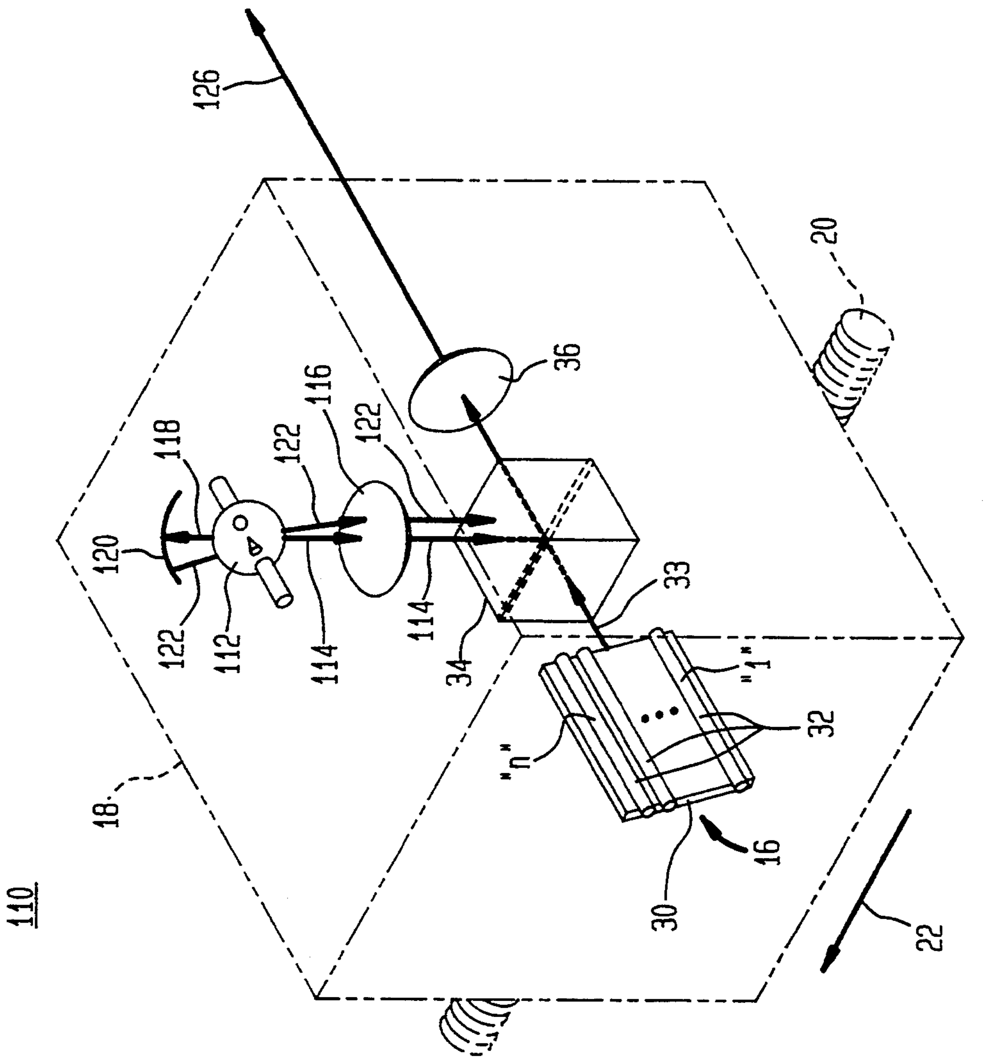
FIG. 5 is a schematic representation showing how two separate light beams are obtained from a single high-power light source such as in FIG. 1.

Referring now to FIG. 5, there are shown certain elements of a thermal printer 110 in accordance with the present invention. Elements of thermal printer 110 which are the same or very similar to those of thermal printer 10 of FIG. 1 have been given the same reference numbers. These elements are arranged and operate as previously described. A high-power light source 112 (similar to source 40 of FIG. 1) shines part of its light downward as a high-power beam 114 through a lens 116 to a beam splitting (combining) prism 34. The high-power light source 112 also shines part of its light upward as a beam 118 to a shaped reflector 120 where it is reflected down as a high-power beam 122 through the lens 116 and to the prism 34. The beams 114 and 122 are slightly displaced from each other as indicated. These two beams 114 and 122, along with the laser beams from the laser channels "1" through "n" (indicated here as a single beam 33), pass through the lens 36 and are here indicated as a combined beam 126. The combined beam 126 is focused as separate light spots to be described shortly on a dye donor element mounted on a print drum (not shown here, but identical to the print drum 12 in FIG. 1). The provision of two light beams 114 and 122 permits the use of lower power compared to the single beam 39 of FIG. 1. The general operation of the thermal printer 110 is otherwise identical to that of the thermal printer 10 (FIG. 1) previously described.

Figure 6:
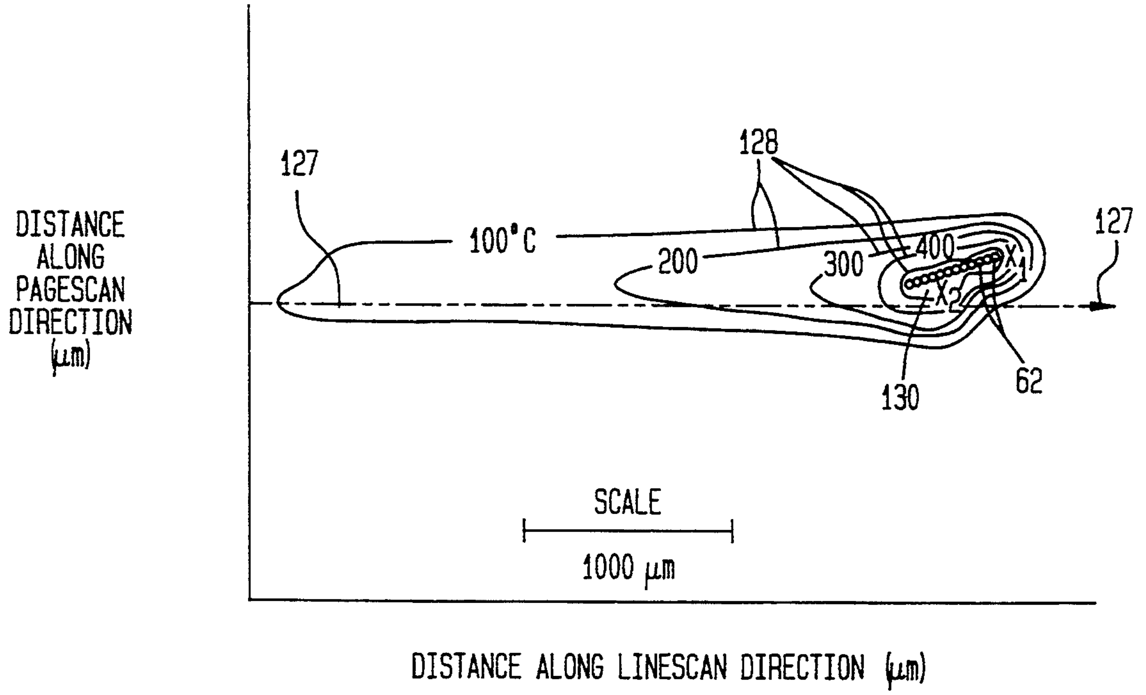
FIG. 6 is a graph similar to FIG. 2 and illustrates elevated equi-temperature contours produced at the dye donor element by two focused light spots of the high-power light source of FIG. 5 during operation of the thermal printer.

Referring now to FIG. 6, there is shown a graph with distance (micrometers) along the pagescan direction on the vertical axis and distance along linescan direction (micrometers) on the horizontal axis. A dashed line horizontal arrow 127 indicates the scanning motion of the laser light spots 62 across the dye donor element in the linescan direction (horizontal axis). Distances along both axes are as indicated by the scale given. This graph shows a number of long narrow equi-temperature contours 128 (in degrees Celsius above ambient) produced in a dye donor element by the two high-power light beams 114 and 122 during operation of the thermal printer 110 of FIG. 5. These high-power beams 114 and 122 are focused on the dye donor element as separate small high-power light spots (not otherwise shown because of the close spacings of the lines in this FIG. 6) having centers respectively of "X1" and "X2". The radius (sigma) of each of these small high-power light spots is, by way of example, 125 micrometers, and their centers "X1" and "X2" are separated by 400 micrometers along an axis lying at an angle of 55° relative to the page scan direction. The center "X1" is located about 80 micrometers in advance of the most forward one of the laser light spots 62 (also in FIG. 2). Surrounding these light spots 62 is a very narrow thin zone 130 having a substantially uniform and elevated temperature of just below the dye vaporization temperature (about 610° C. above ambient). The zone 130 is bounded by the equi-temperature contour 128 of 500° C. The placement shown here of the centers "X1" and "X2" of the high-power light spots produced by the high-power beams 114 and 122 (see FIG. 5) closely tailors the shape of the contour of the zone 130 closely around the line of laser spots 62. The use of two high-power beams 114 and 122 (with centers "X1" and "X2") minimizes the absorbed power from the beams 114 and 122 into the dye donor element that is required to obtain the elevated temperature within the zone 130 compared with the larger zone 64 (see FIG. 2) that results from the single high-power beam 39 with its high-power spot 60. By way of example, the power absorbed into the dye donor element around the centers "X1" and "X2" from the high-power beams 114 and 122 is about 10 watts respectively, for a total of about 20 watts.

It is to be understood that the embodiments of apparatus and method described herein are illustrative of the general principles of the invention. Modifications may readily be devised by those skilled in the art without departing from the spirit and scope of the invention. For example, different numbers and pitches of swath lines and different velocities of printing may be used. Still further, the high-power light source 40 may be different from the one described and the size, position and power absorbed by the zone 64 (or the zone 130) may be changed in accordance with the dye donor element used and the number and position of the laser spots 62.

What is claimed is:

1. A thermal printer system comprising:

a multiple channel print head applying an array of writing laser spots of heat energy to a dye donor element to print individual pixels onto a receiver element in accordance with electronic signals encoding an image being printed;

means for moving the dye donor element relatively past the print head at a controlled velocity, the dye donor element having a dye vaporization temperature substantially above ambient; and thermal energy means for preheating a zone on the dye donor element encompassing the array of writing laser spots which substantially uniformly elevates a temperature throughout the zone to just below the dye vaporization temperature such that thermal interactions between the array of writing laser spots of heat energy are reduced, linearity and range of exposure of said image being printed are improved and artifacts are reduced in the printed image.

2. The thermal printer system of claim 1 wherein:

the array of writing spots of heat energy are provided by respective laser channels "1" through "n" of the print head;

the means for providing relative motion of the print head with respect to the dye donor element at a constant velocity in a line scan direction and a slower velocity in a page scan direction transverse to the line scan direction, the laser channels "1" through "n" printing a swath at a time of an image in the page scan direction;

the array of writing spots of heat energy are aligned on centers along a line having two ends and a midpoint; and the elevated temperature within the zone is substantially uniform along and coincides with the array of writing spots of heat energy provided by the respective laser channels.

3. The thermal printer system of claim 2 in which the thermal energy means for preheating is one or more sources of light which provides at least one spot of light with a Gaussian distribution of radius sigma focused on the dye donor element.

4. The thermal printer system of claim 3 in which the one or more sources of light provides a plurality of spots of light focused on the dye donor element.

5. The thermal printer system of claim 3 in which the source of light is an arc lamp providing heat energy, and the energy from the source absorbed per unit area in the zone of elevated temperature in the dye donor element is about 70 millijoules/cm$^2$.

6. The thermal printer system of claim 3 wherein a center position of the at least one spot of light is from about ½ sigma to about 3/2 sigma ahead of the midpoint of the line along which the array of writing laser spots of heat energy are aligned.

7. A thermal printer system comprising:

a print head having a plurality of laser channels applying an array of writing laser light spots within a swath to a dye donor element to print individual pixels onto a receiver element in accordance with an image being printed;

means for moving the dye donor element in a line scan direction relatively past the print head at a controlled velocity, the dye donor element having a dye vaporization temperature substantially above ambient; and a preheating light source applying a high intensity light spot to the dye donor element, thereby greatly elevating a temperature within a zone on the dye donor element, the elevated temperature within the zone being substantially uniform and being at a temperature just below the dye vaporization temperature, the zone of elevated temperature encompassing the array of writing laser light spots within the swath.

8. The thermal printer system of claim 7 wherein:

there are twelve laser channels which respectively apply the array of writing laser light spots within the swath to the dye donor element;

the array of writing laser light spots are positioned on centers along a line aligned at an angle relative to the line scan direction ahead of the array of writing laser light spots; and the zone of elevated temperature surrounds the array of writing laser light spots.

9. The thermal printer system of claim 8 wherein the preheating light source is an arc lamp, having a color temperature of at least 5000° K. and about 70 millijoules/cm$^2$ of preheating energy if absorbed in the zone of elevated temperature in the dye donor element.

10. The thermal printer system of claim 9 wherein the dye donor element has a dye vaporization temperature of about 610° C. above ambient and the zone of elevated temperature has a substantially uniform temperature slightly below 610° C. above ambient.

11. A thermal printer system comprising:

a print head having multiple laser channels "1" through "n" applying an array of writing laser spots to a dye donor element to print individual pixels onto a receiver element in accordance with an image being printed, the array of writing laser spots spaced on centers along a line, and the dye donor element having a dye vaporization temperature substantially above ambient;

a cylindrical drum for holding the dye donor element closely on top of the receiver element and for moving the dye donor and receiver elements at a constant velocity in a line scan direction past the print head, the array of writing laser spots being focused on the dye donor element;

feed means for moving the print head relative to the cylindrical drum in a page scan direction substantially orthogonal to the line scan direction, the line of centers of the array of writing laser spots being aligned at an angle relative to the page scan direction; and preheating source applying at least one light spot to the dye donor element, thereby producing a zone of elevated temperature just below dye vaporization encompassing the array of writing laser spots.

12. The thermal printer system of claim 11 wherein:

the array of writing laser spots prints a swath of lines of an image, successive swaths being displaced by a constant distance in the page scan direction;

the velocity of the dye donor element relative to the print head in the line scan direction is about 10 m/sec.;

the dye vaporization temperature is about 610° C. above ambient; and the energy absorbed per unit in the dye donor element from the preheating light spot of the light source means is about 70 millijoules/cm$^2$ in the zone of elevated temperature encompassing the array of writing laser spots.

13. The thermal printer system of claim 12 wherein the preheating source comprises an arc lamp.

14. The thermal printer system of claim 12 wherein the preheating light source means applies a plurality of light spots to the dye donor element such that the zone of elevated temperature encompasses the array of writing laser spots whereby a greater fraction of the light is directed toward the zone of elevated temperature so that the total energy required from the preheating source is reduced as compared to a preheating source in the form of a single light spot.

15. The thermal printer system of claim 12 wherein the preheating light source means applies a single light spot to the dye donor element, and the energy absorbed per unit area in the zone of elevated temperature by the dye donor element from the light source means is about 70 millijoules/cm$^2$.

16. A method of operating a thermal printer, the method comprising the steps of:

applying to a dye donor element an array of writing spots of heat energy to print pixels onto a receiver element in accordance with the image being printed, the dye in the dye donor element having a substantially elevated vaporization temperature;

moving the dye donor element relatively past the array of writing spots of heat energy at a controlled velocity; and applying from a preheating source a spot of heat energy to the dye donor element so as to elevate a dye donor temperature substantially uniformly to just below the dye vaporization temperature within a zone encompassing the array of writing spots of heat energy.

17. The method of claim 16 wherein the spot of heat energy is provided by a preheating light source having a color temperature of at least 5000° K.

18. The method of claim 16 wherein:

the controlled velocity is about 10 m/sec;

the energy absorbed per unit area of the zone of elevated temperature encompassing the array of writing spots of heat energy in the dye donor element from the preheating source is about 70 millijoules/cm$^2$; and the dye vaporization temperature is about 610° C. above ambient.

19. A method of operating a thermal printer comprising the steps of:

applying an array of writing laser light spots in a swath to a dye donor element to print lines of pixels onto a receiver element in accordance with an image being printed;

moving the dye donor element relative to the array of writing laser light spots in a line scan direction at a controlled velocity, the dye donor element having a dye vaporization temperature substantially above ambient; and applying a light spot from one or more preheating sources to the dye donor element for greatly elevating a temperature within a zone encompassing the array of writing light spots on the dye donor element, the temperature within the zone being substantially uniform and being elevated to a value just below the dye vaporization temperature.

20. The method of claim 19 in which the light spot from each of the preheating sources applied to the dye donor element such that the area of said zone of elevated temperature encompasses the array of writing laser light spots.

21. The method of claim 19 in which the light spot from the one or more preheating sources has a color temperature of about 5000° K.

22. A thermal printer comprising:

a multiple channel print head applying spots of heat energy for writing to a dye donor element thereon in accordance with an image being printed;

means for moving the dye donor element relatively past the print head at a controlled velocity, the dye donor element having a dye vaporization temperature substantially above ambient; and thermal energy means for preheating a zone on the dye donor element encompassing the array of writing laser spots which substantially uniformly elevates a temperature in said zone to just below the dye vaporization temperature such that thermal interactions between the array of writing laser spots of heat energy are reduced, linearity and range of exposure of said image being printed are improved and printing artifacts are reduced.

23. A thermal printer system comprising:

a print head having multiple laser channels "1" through "n" applying an array of writing laser spots to a dye donor element to print individual pixels thereon, the array of writing laser spots spaced on centers along a line and the dye donor element having a dye vaporization temperature substantially above ambient;

means holding the dye donor element for moving the dye donor element at a constant velocity in a line scan direction past the print head, the array of writing laser spots being focused on the dye donor element;

feed means for moving the print head relative to the dye donor element in a page scan direction substantially orthogonal to the line scan direction, the line of centers of the array of writing laser spots being aligned at an angle relative to the page scan direction; and preheating light source means providing heat energy for applying at least one light spot to the dye donor element thereby producing a zone of elevated temperature just below dye vaporization encompassing the array of writing laser spots.

24. A method of operating a thermal printer, said method comprising the steps of:

applying to a dye donor element an array of writing spots of heat energy to print pixels onto the dye donor element in accordance with the image being printed, the dye in the dye donor element having a vaporization temperature substantially elevated above ambient;

moving the dye donor element relatively past the array of writing spots of heat energy at a controlled velocity; and applying from a preheating source a spot of heat energy to the dye donor element over a zone encompassing the array of writing spots so as to elevate a dye donor temperature substantially uniformly to just below the dye vaporization temperature throughout said zone.

25. A method of operating a thermal printer, said method comprising the steps of:

applying to a dye donor element an array of writing laser spots to print individual pixels thereon in accordance with an image being printed, the array of writing laser spots are spaced on centers along a line, and the dye donor element having a vaporization temperature substantially above ambient;

holding the dye donor element for movement at a constant velocity in a line scan direction past an array of writing laser spots being focused on the dye donor element from a print head;

moving the print heat relative to the dye donor in a page scan direction substantially orthogonal to this line scan direction, the line of centers of the array of writing laser spots being aligned at an angle relative to the page scan direction; and preheating by at least one light spot on the dye donor element to produce a zone of elevated temperature just below the temperature of dye vaporization encompassing the array of writing laser spots.

* * * * *